US012394904B2

(12) United States Patent
Oh et al.

(10) Patent No.: US 12,394,904 B2
(45) Date of Patent: Aug. 19, 2025

(54) METASURFACE FOR SMARTPHONE ANTENNA, AND SMARTPHONE DEVICE COMPRISING SAME

(71) Applicant: SEOUL NATIONAL UNIVERSITY R&DB FOUNDATION, Seoul (KR)

(72) Inventors: Jungsuek Oh, Incheon (KR); Jaebaek Jung, Seoul (KR)

(73) Assignee: Seoul National University R&DB Foundation, Seoul (KR)

(*) Notice: Subject to any disclaimer, the term of this patent is extended or adjusted under 35 U.S.C. 154(b) by 275 days.

(21) Appl. No.: 18/021,710

(22) PCT Filed: Aug. 20, 2021

(86) PCT No.: PCT/KR2021/011086
§ 371 (c)(1),
(2) Date: Feb. 16, 2023

(87) PCT Pub. No.: WO2022/050606
PCT Pub. Date: Mar. 10, 2022

(65) Prior Publication Data
US 2023/0318183 A1 Oct. 5, 2023

(30) Foreign Application Priority Data
Sep. 3, 2020 (KR) ........................ 10-2020-0112183
Aug. 13, 2021 (KR) ........................ 10-2021-0107229

(51) Int. Cl.
*H01Q 9/04* (2006.01)
*H01Q 1/24* (2006.01)
*H01Q 15/00* (2006.01)

(52) U.S. Cl.
CPC ........... *H01Q 9/0407* (2013.01); *H01Q 1/242* (2013.01); *H01Q 1/243* (2013.01); *H01Q 15/006* (2013.01)

(58) Field of Classification Search
CPC ...... H01Q 9/0407; H01Q 1/242; H01Q 1/243; H01Q 15/006
See application file for complete search history.

(56) References Cited

U.S. PATENT DOCUMENTS 10,170,945 B2 1/2019 Yoo
10,978,780 B2 * 4/2021 Ryoo .................. H01Q 21/293
(Continued)

FOREIGN PATENT DOCUMENTS

KR 10-2016-0010264 A 1/2016
KR 10-1584909 B1 1/2016
(Continued)

OTHER PUBLICATIONS

PCT International Search Report, PCT/KR2017/013353, Jul. 6, 2018, 4 Pages.
(Continued)

*Primary Examiner* — Hai V Tran
(74) *Attorney, Agent, or Firm* — Fenwick & West LLP

(57) ABSTRACT

A metasurface for a smartphone antenna, according to one embodiment of the present invention, is located between a smartphone cover case and a patch type array antenna, and is characterized by having a two-dimensional grid structure in which a plurality of rectangular openings are formed. The introduction, to a smartphone device, of the metasurface according to the embodiment satisfies the bandwidth required for 5G technology and improves the performance of the antenna.

8 Claims, 8 Drawing Sheets

(56) References Cited

U.S. PATENT DOCUMENTS

| | | | | |
|---|---|---|---|---|
| 11,038,276 | B2 | 6/2021 | Park et al. | |
| 11,133,596 | B2 * | 9/2021 | Ou | H01Q 9/0414 |
| 2015/0244079 | A1 * | 8/2015 | White | H01Q 15/0013 343/913 |
| 2017/0237299 | A1 | 8/2017 | Yoo | |
| 2019/0229398 | A1 * | 7/2019 | Ryoo | H01Q 1/243 |
| 2020/0373678 | A1 * | 11/2020 | Park | H01P 3/121 |
| 2021/0203059 | A1 * | 7/2021 | Ryoo | H01Q 15/008 |
| 2022/0384954 | A1 * | 12/2022 | Moon | H01Q 1/425 |

FOREIGN PATENT DOCUMENTS

| | | | |
|---|---|---|---|
| KR | 10-2037227 | B1 | 10/2019 |
| KR | 10-2020-0006933 | A | 1/2020 |
| KR | 10-2020-0060328 | A | 5/2020 |
| KR | 10-2107023 | B1 | 5/2020 |

OTHER PUBLICATIONS

Jeong, J-B, et al., "The Design of a millimeter wave 5G smartphone patch antenna using a net structure," Aug. 21, 2020, The Korean Institute of Electromagnetic Engineering and Science, 202 Summer Conference, Section II, Figure 2.

* cited by examiner

METASURFACE FOR SMARTPHONE ANTENNA, AND SMARTPHONE DEVICE COMPRISING SAME

TECHNICAL FIELD

The present disclosure relates to a metasurface for a smartphone antenna and a smartphone device having the same, and more particularly, to a metasurface designed with a non-uniform grid structure to increase the gain of a 5th generation (5G) millimeter wave patch antenna embedded in a smartphone and a smartphone device having the metasurface embedded therein.

DESCRIPTION OF GOVERNMENT-FUNDED RESEARCH AND DEVELOPMENT

This research is conducted by Seoul National University R&DB Foundation under the support of Broadcast Communications Industry Research & Development (R&D) (Development of dual band beamforming antenna-on-package technology based on millimeter wave metasurface for 5th generation (5G) smartphones, Project Serial Number: 1711126332) of Ministry of Science and ICT.

BACKGROUND ART

5th generation (5G) technology is the next stage that supersedes 4th generation mobile communication, and may be classified into communication technologies using the frequency band of 6 GHz or less used in the low speed wide area network and the frequency band of 24 GHz or more used in the ultrahigh speed local area network. In the present time, FR2 commercial services using the frequency band of 24 GHz or more are not yet established, and Sub-6 GHz commercial services using the frequency band of 6 GHz or less are being deployed.

In the millimeter wave band, '5G plus' project is being conducted to plan for enlargement and commercialization of extra bandwidth to the existing 5G frequencies (26.5-28.9 GHz), and in the case of millimeter wave 5G, it is difficult to ensure the coverage due to much larger losses and narrower beams than Sub-6 GHz. In contrast, as the operating bandwidth and coverage requirements are getting higher and higher, global Information Technology (IT) companies are devoting efforts to the development of new antenna-on-package technology.

Meanwhile, metasurfaces are technology applied to increase the gain of antennas having fixed maximum performance or steer beams with minimum losses, and in this industry, metasurfaces are usually designed as flat structures in which unit cells are arranged in two dimensions on a substrate, each unit cell comprising a dielectric and a metal patch. There are many applications of metasurface technology in the frequency band of 10 GHz or more used in drones or automotive radars, but applications of metasurfaces to millimeter wave 5G smartphone antennas are rare.

An output radio signal from an antenna embedded in a smartphone is not directly sent in air and is sent through a dielectric and a tempered glass cover case that protect the antenna, and the influence of the dielectric and the tempered glass on the antenna performance is very large due to the characteristics of millimeter waves with higher frequencies than the existing communication frequencies, and thus, designing a metasurface structure is not easy due to the operating environment that is different from the existing smartphone antenna.

Accordingly, to apply the metasurface technology to the millimeter wave 5G smartphone antennas, it is necessary to minimize a performance difference between the design antenna and the real antenna considering the structure of the dielectric and the tempered glass cover case.

DISCLOSURE

Technical Problem

The present disclosure is directed to providing a metasurface structure designed considering a dielectric and a tempered glass cover case of a smartphone to increase the gain of a 5th generation (5G) millimeter wave patch antenna embedded in the smartphone.

The present disclosure is further directed to providing a smartphone device having the metasurface with reduced performance difference between the design antenna and the real antenna, and improved antenna performance while satisfying the bandwidth required for 5G technology.

Technical Solution

A metasurface for a smartphone antenna according to an embodiment is located between a smartphone cover case and a patch type array antenna to increase a gain of the antenna, and has a two-dimensional grid structure having a plurality of rectangular openings.

According to an embodiment, the plurality of rectangular openings may be designed with an asymmetrical structure having different horizontal and vertical lengths.

According to an embodiment, antenna devices of the patch type array antenna may have different active reflection coefficients, and the horizontal and vertical lengths of the rectangular opening may be determined according to characteristics of the antenna devices located below each opening.

According to an embodiment, a thickness of the metasurface may be set to 15 μm or less.

According to an embodiment, an operating bandwidth of the antenna may be set to 26.1 GHz to 29.6 GHz.

According to an embodiment, a dielectric may be located between the metasurface and the patch type array antenna, and the smartphone cover case may include a tempered glass material.

According to an embodiment, the antenna may be designed considering reflection and refraction paths of radio waves according to constituent materials and thicknesses of the dielectric and the smartphone cover case.

A smartphone device having a metasurface for an antenna according to an embodiment includes a smartphone body; a patch type array antenna embedded in one surface of the smartphone body; a dielectric located on the patch type array antenna; a metasurface for a smartphone antenna located on the dielectric; and a cover case secured to the smartphone body while covering the metasurface, wherein the metasurface has a two-dimensional grid structure having a plurality of rectangular openings, and increases a gain of the antenna.

Advantageous Effects

According to an embodiment of the present disclosure, there may be provided the metasurface designed considering the dielectric and the tempered glass cover case of the smartphone to increase the gain of the 5th generation (5G) millimeter wave patch antenna embedded in the smartphone.

According to another embodiment, there may be provided the smartphone device with the improved antenna performance while satisfying the bandwidth required for 5G technology through the antenna and the metasurface structure designed considering the dielectric and the tempered glass of the smartphone.

DESCRIPTION OF DRAWINGS

The following is a brief introduction to necessary drawings in the description of the embodiments to describe the technical solutions of the embodiments of the present disclosure or the prior art more clearly. It should be understood that the accompanying drawings are for the purpose of describing the embodiments of the present disclosure and are not intended to be limiting of the present disclosure. Additionally, for clarity of description, illustration of some elements in the accompanying drawings may be exaggerated and omitted.

BEST MODE

Figure 1A:
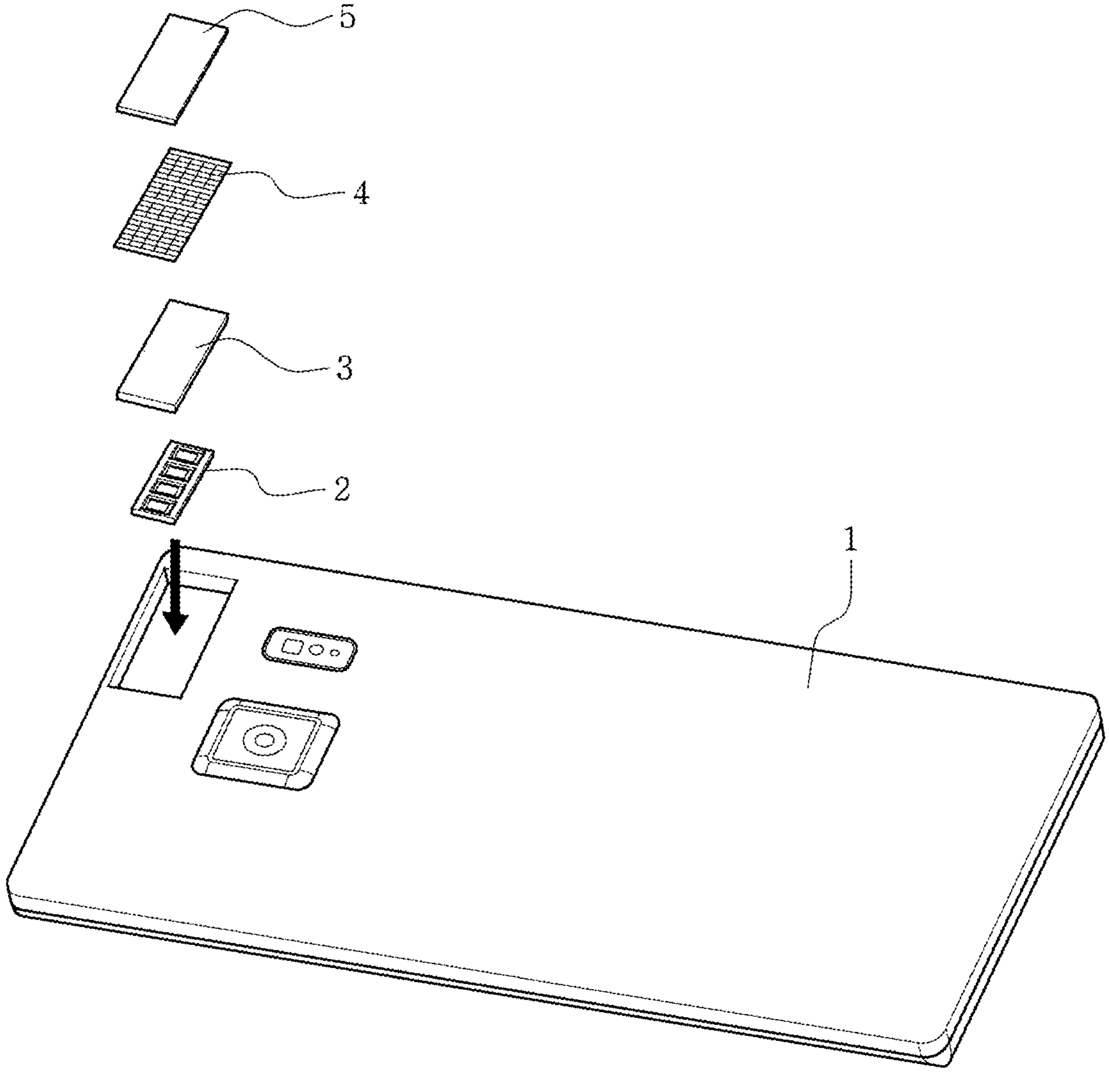
FIG. 1A shows the structure of a smartphone device having a metasurface according to an embodiment.

The following detailed description of the present disclosure is made with reference to the accompanying drawings showing particular embodiments for practicing the present disclosure by way of illustration. These embodiments are described in sufficiently detail for those skilled in the art to practice the present disclosure. It should be understood that various embodiments of the present disclosure are different but do not need to be mutually exclusive. For example, particular shapes, structures and features described herein in connection with one embodiment may be embodied in other embodiment without departing from the spirit and scope of the present disclosure. It should be further understood that changes may be made to the positions or placement of individual elements in each disclosed embodiment without departing from the spirit and scope of the present disclosure. Accordingly, the following detailed description is not intended to be taken in limiting senses, and the scope of the present disclosure, if appropriately described, is only defined by the appended claims along with the full scope of equivalents to which such claims are entitled. In the drawings, similar reference signs indicate same or similar functions in many aspects.

The terms as used herein are general terms selected as those being now used as widely as possible in consideration of functions, but they may differ depending on the intention of those skilled in the art or the convention or the emergence of new technology. Additionally, in certain cases, there may be terms arbitrarily selected by the applicant, and in this case, the meaning will be described in the corresponding description part of the specification. Accordingly, it should be noted that the terms as used herein should be interpreted based on the practical meaning of the terms and the context throughout the specification, rather than simply the name of the terms.

Hereinafter, exemplary embodiments of a metasurface for a smartphone antenna and a smartphone device having the same will be described in detail with reference to the accompanying drawings.

FIG. 1A shows the structure of a smartphone device having a metasurface according to an embodiment. The smartphone device according to an embodiment includes a smartphone body 1, a patch type array antenna 2 embedded in one surface of the smartphone body 1, a dielectric 3 located on the patch type array antenna 2, a metasurface 4 for a smartphone antenna located on the dielectric 3, and a cover case 5 secured to the smartphone body 1 while covering the metasurface 4.

Figure 1B:
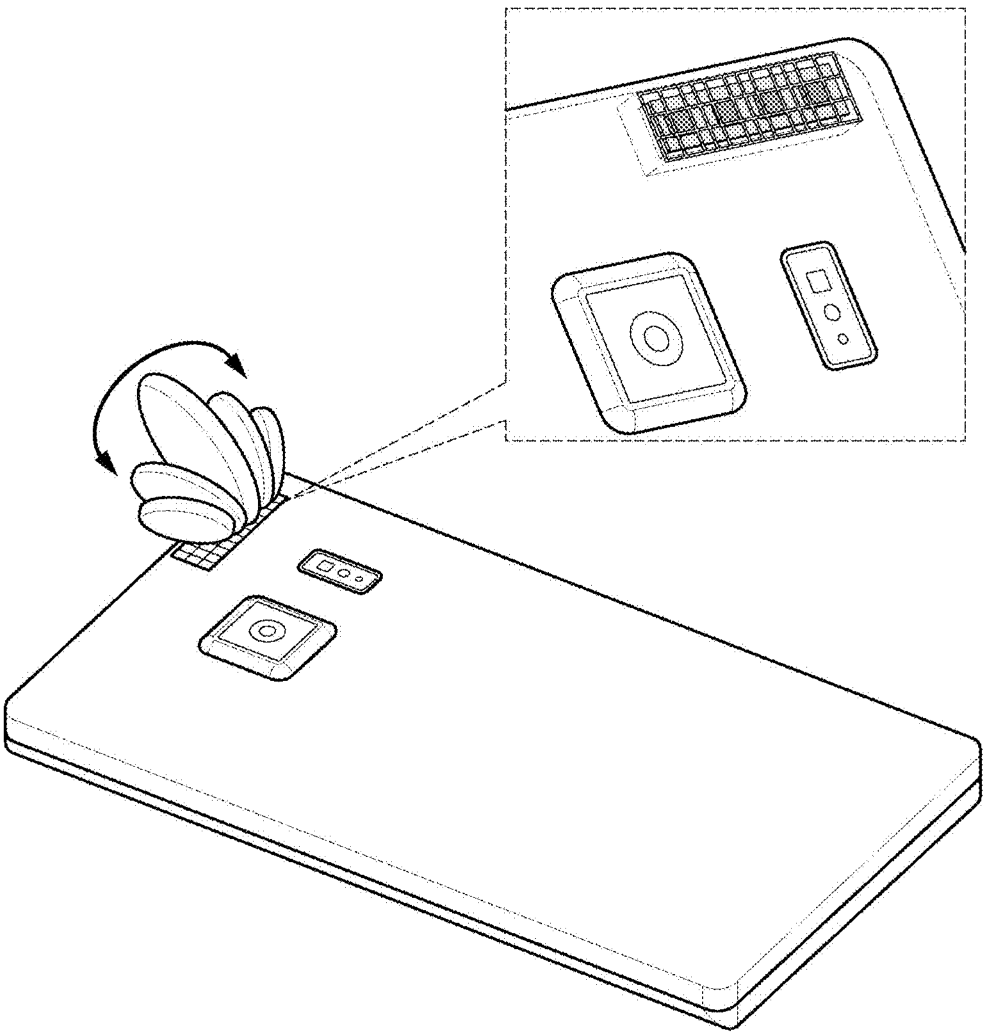
FIG. 1B illustrates signal radiation from a rear surface of a smartphone device having a metasurface according to an embodiment.

FIG. 1B illustrates signal radiation from the rear surface of the smartphone device having the metasurface according to an embodiment. As shown, the output signal from the antenna 2 embedded in the smartphone is sent in air through the dielectric 3, the metasurface 4 and the cover case 5.

The smartphone body 1 is a device capable of wireless communication, and may transmit and receive a signal and data via communication with an external device through the embedded antenna. The antenna and a communication module may be included to transmit and receive the signal, and the radio signal may be sent from the smartphone to the external device through the antenna or the signal may be received from the external device.

The term smartphone is used in the specification, but it does not refer to only a specific type of device or telephone, and includes any type of electronic device capable of wireless communication with the external device using the antenna and the communication module. For example, various types of communication terminals capable of 5th generation (5G) millimeter wave communication such as a tablet personal computer (PC), a laptop PC and a wearable device may be included in the concept of the smartphone.

Figure 2:
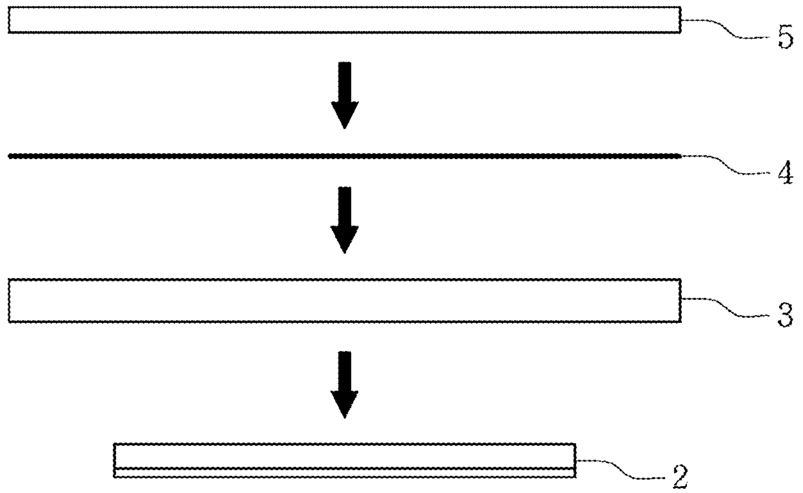
FIG. 2 shows a connection structure of a metasurface, a patch antenna, a dielectric and a smartphone cover case according to an embodiment when viewed from the side.

FIG. 2 is an exploded view of some components of the smartphone device according to an embodiment when viewed from the side. As shown, the patch antenna 2, the dielectric 3, the metasurface 4 and the smartphone cover case 5 are connected in a sequential order.

Figure 3A:
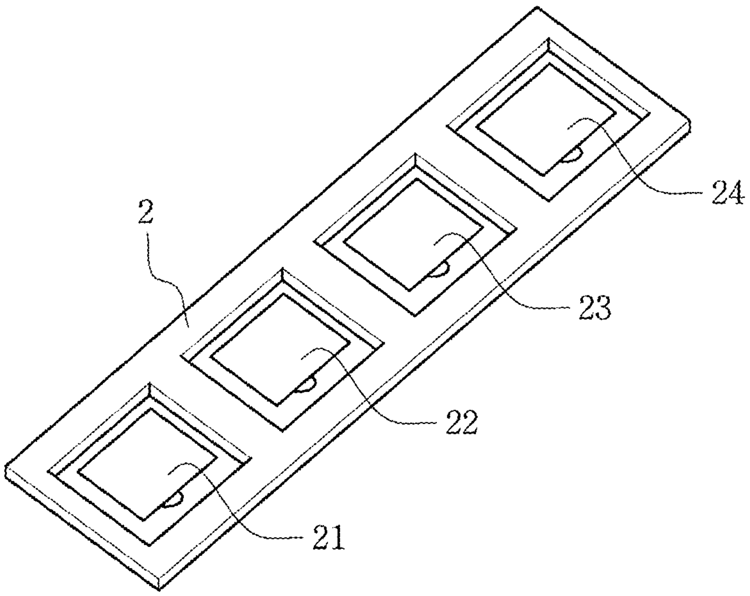
FIGS. 3A and 3B show the structure of a patch type array antenna according to an embodiment.

FIG. 3A shows the structure of the patch type array antenna according to an embodiment. The patch type array antenna 2 is an antenna including a plurality of antenna devices 21, 22, 23, 24 arranged on a thin substrate, and may be designed with an asymmetrical structure in which the antenna devices have different active reflection coefficients. FIG. 3A shows the 1×4 array antenna, but this is provided by way of illustration only, and a smaller or larger number of antenna devices may be arranged in a one- or two-dimensional structure.

Figure 3B:
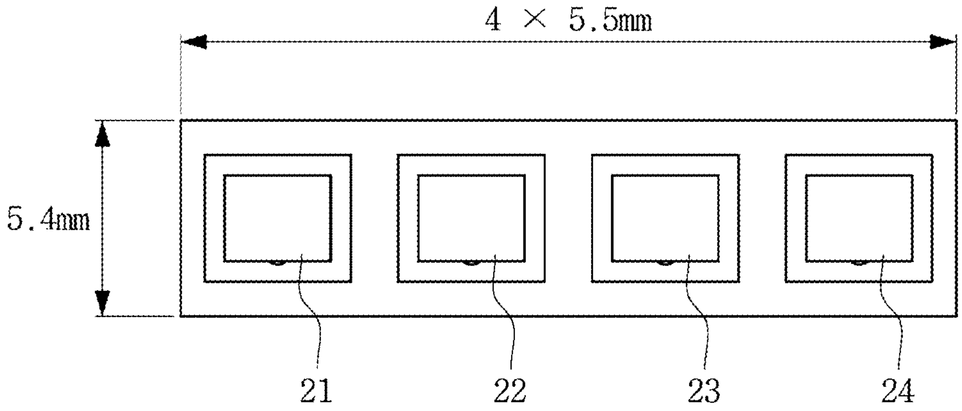

FIG. 3B shows the structure of the patch type array antenna 2 according to an embodiment when viewed from top. According to an embodiment, the total antenna area may be set to $4\times22$ mm$^2$, and the thickness may be set to about 0.78 mm. The antenna terminals may be designed in an array antenna pattern to improve the gain characteristics. According to an embodiment, the operating bandwidth of the patch antenna is about 26.1 GHz to 29.6 GHz, and may be set to the specification satisfying 3 GHz or more in the 5G millimeter wave frequency band of 24.5 to 29.5 GHz.

Additionally, each of the antenna devices 21, 22, 23, 24 may be designed considering the reflection and refraction paths of radio waves according to the constituent materials and thicknesses of the dielectric 3 and the smartphone cover case 5.

The dielectric 3 is a layer of dielectric material and is disposed on the patch antenna to protect the antenna. Considering that the smartphone body is typically about 7 mm in in thickness, the thickness of the dielectric 3 may be set to about 1 mm.

The metasurface 4 is the component for improving the gain of the antenna through interactions with the output radio waves from the antenna 2, and is located between the dielectric 3 and the cover case 5. As shown in FIG. 2, the metasurface 4 may be designed with much smaller thickness than the other components.

Figure 4:
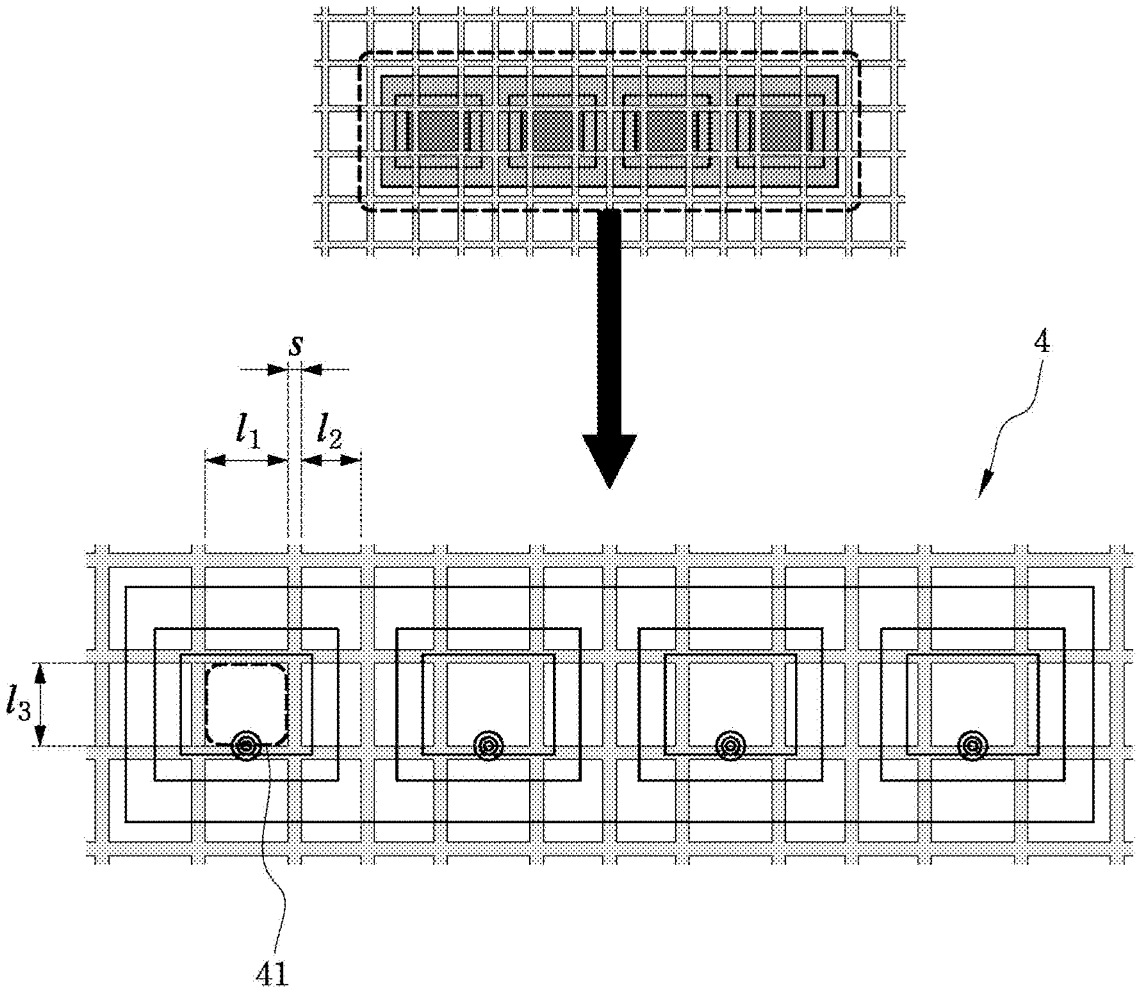
FIG. 4 shows a metasurface having a two-dimensional grid structure and an underlying patch type array antenna according to an embodiment.
Figure 6A:
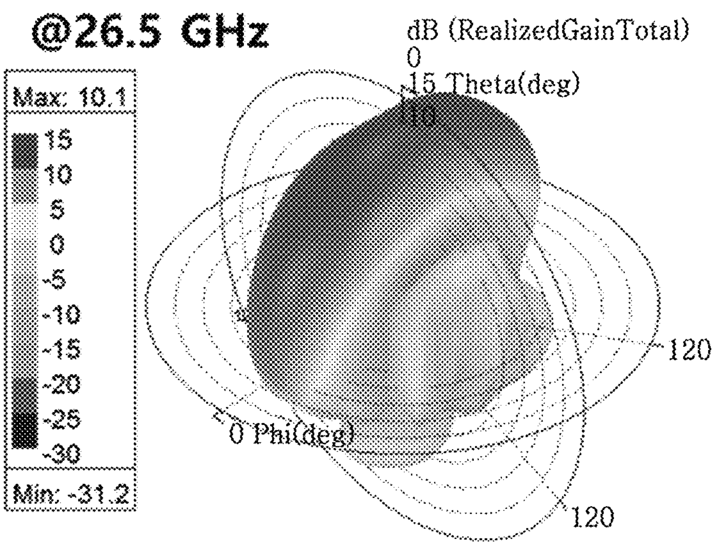
FIGS. 6A to 6C show antenna gain simulation results of a smartphone device having no metasurface.
Figure 6B:
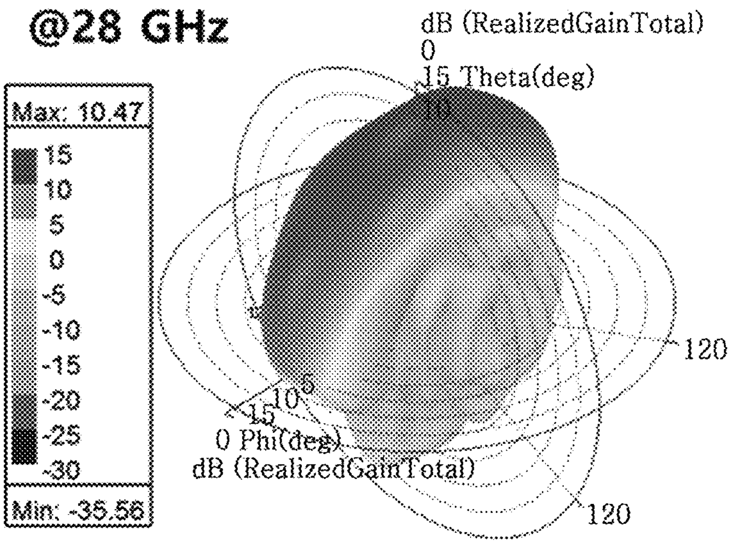
Figure 6C:
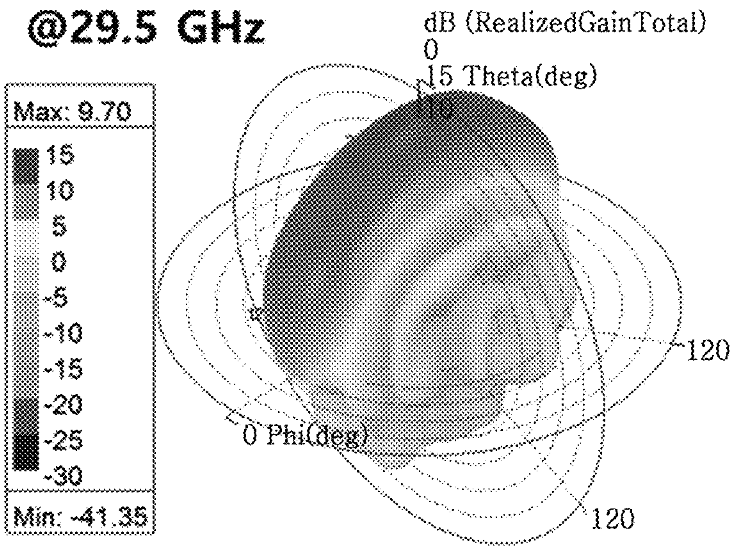
Figure 7A:
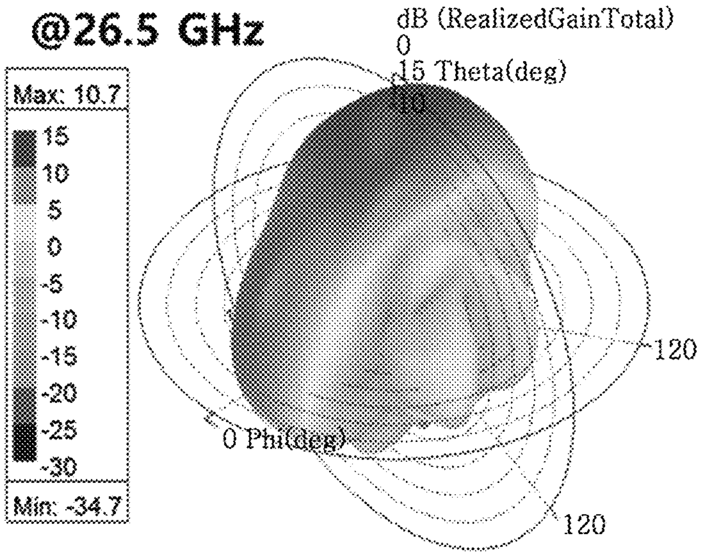
FIGS. 7A to 7C show antenna gain simulation results of a smartphone device having a metasurface according to an embodiment.
Figure 7B:
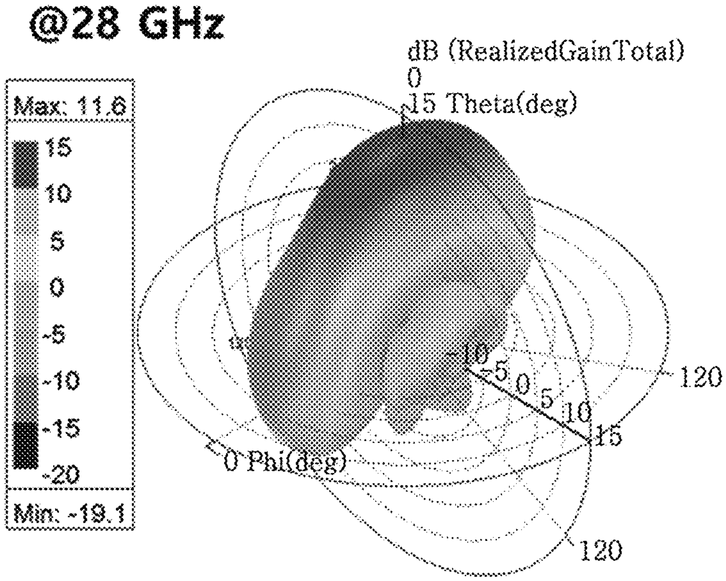
Figure 7C:
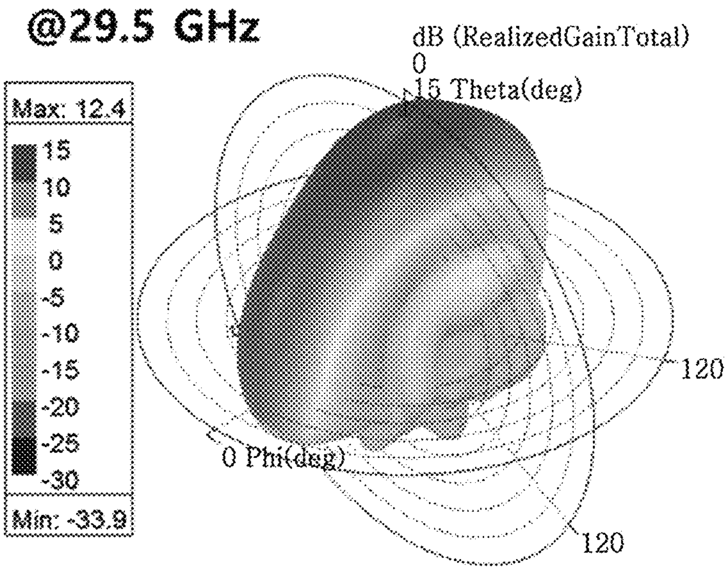

FIG. 4 shows the metasurface having a two-dimensional grid structure and the underlying patch type array antenna according to an embodiment. As shown, the metasurface 4 may be designed with a two-dimensional grid structure having a plurality of rectangular openings 41, and serves to improve the gain of the antenna using the inductive grid structure. When the two-dimensional metasurface according to an embodiment is inserted, the antenna gain may reach up to 12.4 dB within the operating frequency. It will be described below with reference to FIGS. 6 and 7.

Referring to FIG. 4, the metasurface 4 is located immediately on the antenna devices of the patch array antenna, and may be made with a non-uniform (asymmetrical) structure having different magnitudes of design parameters such as the horizontal length $l_1$ and the vertical length $l_3$ of the opening 41 of the grid, the horizontal length $l_2$ of the adjacent grid and the width s of the grid. In the case of a single antenna, not the array antenna, the structure of the metasurface may be designed with a uniform structure, while in the case of the array antenna having the commonly designated distance between patches according to the frequency band, the structure of the metasurface may be designed with a non-uniform structure considering the distance between patches as shown in FIG. 4. Additionally, the horizontal and vertical lengths of each opening may be determined considering the characteristics of the antenna devices located below each opening.

The metasurface is applied to single polarized patch antennas as well as circular patch antennas having circular polarization and dual polarized patch antennas, and thus has a wide range of applications. Accordingly, it is possible to improve the performance of various types of patch antennas by applying not only the metasurface of grid structure but also the metasurface having various patterns.

The cover case 5 covers the antenna 2 and the metasurface 4 inserted into the smartphone body 1 to protect them, and may be made of a material having permeability to radio waves and high strength such as tempered glass. The output signal from the smartphone antenna passes through not only the dielectric but also the tempered glass cover case, and this may have a great influence on the propagation of the high frequency signal such as 5G millimeter waves.

Figure 5:
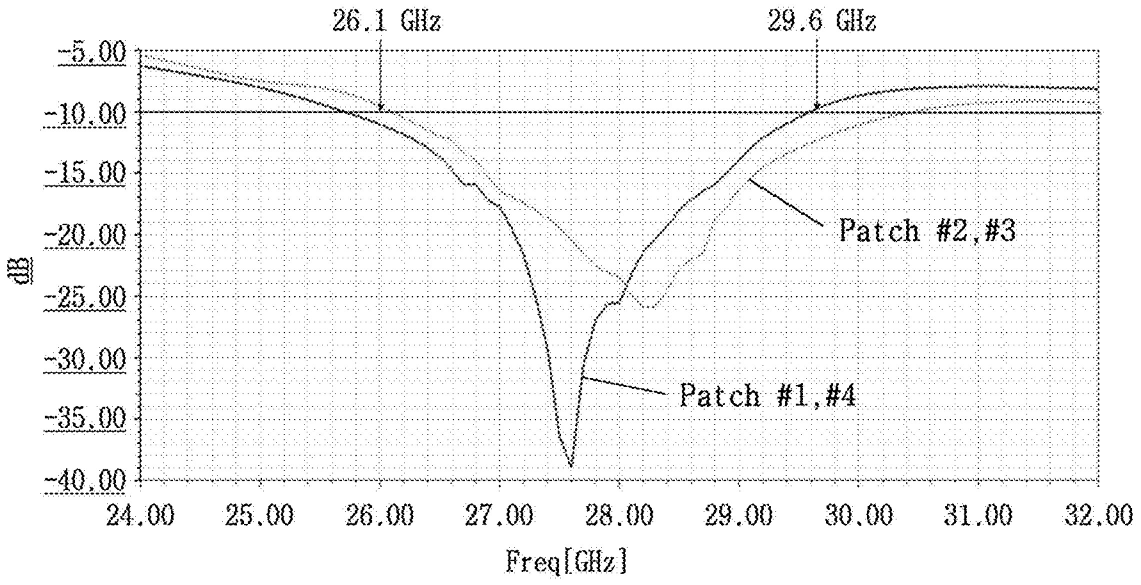
FIG. 5 is a graph showing the active reflection coefficient for each antenna device in a patch type array antenna according to an embodiment.

FIG. 5 is a graph showing the active reflection coefficient for each antenna device in the patch type array antenna (1×4 array antenna) according to an embodiment. As can be seen through the graph, patches #1 and #4 and patches #2 and #3 have an asymmetrical structure, so the active reflection coefficient values are different. Here, the operating bandwidth of the antenna is set to the frequency band when all the active reflection coefficient values are −10 dB or less, and as can be seen through the graph of FIG. 5, the antenna operating bandwidth is 26.1 to 29.6 GHz, and satisfies 3 GHz or more in the 5G millimeter wave frequency band of 24.5 to 29.5 GHz.

FIG. 6 shows the antenna gain simulation results of a smartphone device having no metasurface, and FIG. 7 shows the antenna gain simulation results of the smartphone device having the metasurface according to an embodiment.

From each simulation result, the maximum gain (Max Gain) values at 26.5 GHz, 28 GHz and 29.5 GHz frequencies in the operating band may be compared. When comparing FIG. 6A with FIG. 7A, it can be seen that there is a 0.6 dB gain improvement from 10.1 dB to 10.7 dB in the 26.5 GHz band, when comparing FIG. 6B with FIG. 7B, it can be seen that there is a 1.13 dB gain improvement from 10.47 dB to 11.6 dB in the 28 GHz band, and when comparing FIG. 6C with FIG. 7C, it can be seen that there is a 2.7 dB gain improvement from 9.7 dB to 12.4 dB in the 29.5 GHz band. That is, it can be seen that as the two-dimensional metasurface according to an embodiment is inserted, the antenna gain increases up to 12.4 dB in the operating frequency, and the performance is improved.

According to the above-described embodiment, there is provided the metasurface designed considering the dielectric and the tempered glass cover case of the smartphone to increase the gain of the 5G millimeter wave patch antenna embedded in the smartphone. Additionally, there is provided the smartphone device with the improved antenna performance while satisfying the bandwidth required for 5G technology through the antenna and the metasurface structure designed considering the dielectric and the tempered glass of the smartphone.

While the present disclosure has been hereinabove described with reference to the embodiments, those skilled in the art will understand that many modifications and changes may be made thereto without departing from the spirit and scope of the present disclosure set forth in the appended claims.

The invention claimed is:

1. A metasurface for a smartphone antenna, the metasurface comprising:

a two-dimensional grid structure having a plurality of rectangular openings, the plurality of rectangular openings including a first opening having a first size and a second opening having a second size that is different from the first size and the first opening and the second opening are non-overlapping in a plan view of the metasurface, wherein the metasurface is configured to be located between a smartphone cover case and a patch type array antenna that includes a plurality of antenna devices, wherein the first opening having the first size and the second opening having the second size are configured to overlap a same antenna device from the plurality of antenna devices in the plan view of the metasurface.

2. The metasurface for the smartphone antenna according to claim 1, wherein the first opening has a first horizontal length and the second opening has a second horizontal length than is smaller than the first horizontal length.

3. The metasurface for the smartphone antenna according to claim 2, wherein the plurality of antenna devices of the patch type array antenna have different active reflection coefficients, and wherein the first horizontal length and the second horizontal length and a vertical length of the plurality of rectangular openings are determined according to characteristics of the plurality of antenna devices located below each of the plurality of rectangular openings.

4. The metasurface for the smartphone antenna according to claim 1, wherein a thickness of the metasurface is 15 μm or less.

5. The metasurface for the smartphone antenna according to claim 1, wherein an operating bandwidth of the patch type array antenna is 26.1 GHz to 29.6 GHz.

6. The metasurface for the smartphone antenna according to claim 1, wherein a dielectric is located between the metasurface and the patch type array antenna, and wherein the smartphone cover case includes a tempered glass material.

7. The metasurface for the smartphone antenna according to claim 6, wherein the patch type array antenna is designed considering reflection and refraction paths of radio waves according to constituent materials and thicknesses of the dielectric and the smartphone cover case.

8. A smartphone device comprising:

a smartphone body;

a patch type array antenna embedded in one surface of the smartphone body, the patch type array antenna including a plurality of antenna devices;

a dielectric located on the patch type array antenna;

a metasurface located on the dielectric; and a cover case secured to the smartphone body while covering the metasurface such that the metasurface is between the cover case and the dielectric, wherein the metasurface has a two-dimensional grid structure having a plurality of rectangular openings including a first opening having a first size and a second opening having a second size that is different from the first size and the first opening and the second opening are non-overlapping in a plan view of the metasurface, wherein the first opening having the first size and the second opening having the second size are configured to overlap a same antenna device from the plurality of antenna devices in a plan view of the smartphone device, and wherein the metasurface configured to increase a gain of the patch type array antenna.

* * * * *